June 15, 1943.   H. I. BECKER   2,321,971
TELEMETERING SYSTEM
Filed Sept. 18, 1941   2 Sheets-Sheet 1
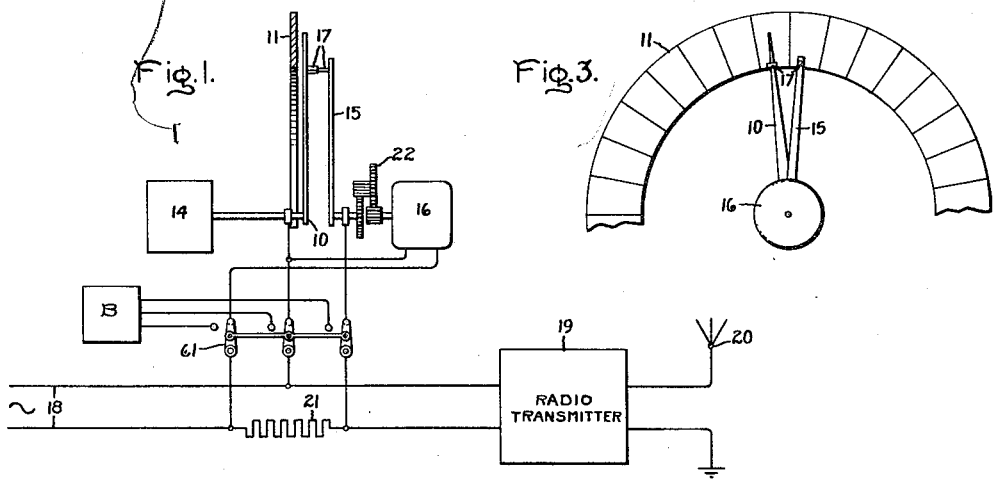
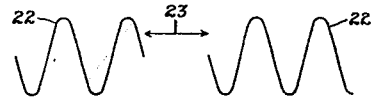
Inventor:
Howard I. Becker,
by Harry E. Dunham
His Attorney.

June 15, 1943. H. I. BECKER 2,321,971
TELEMETERING SYSTEM
Filed Sept. 18, 1941 2 Sheets-Sheet 2
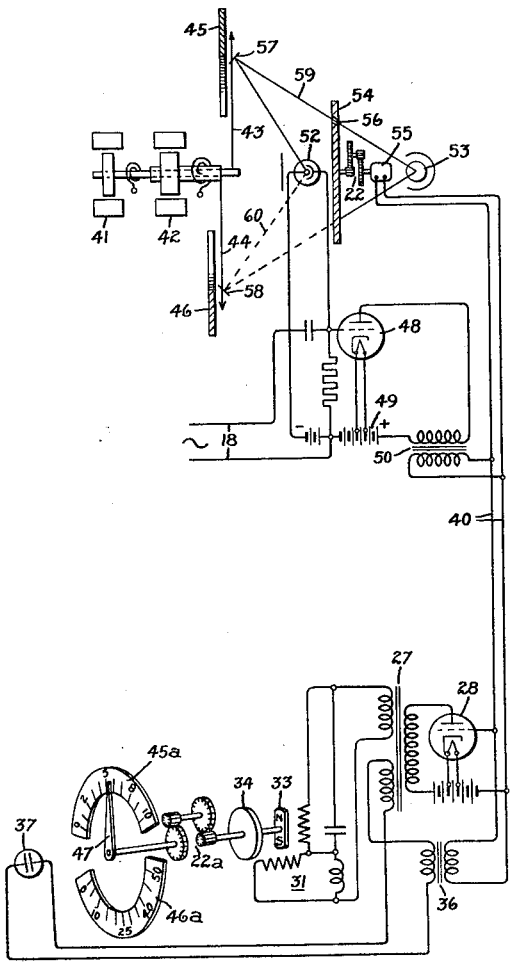
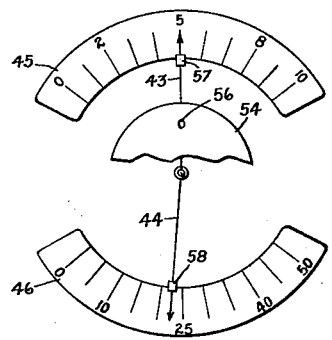
Inventor:
Howard I. Becker,
by Harry E. Dunham
His Attorney.

Patented June 15, 1943

2,321,971

UNITED STATES PATENT OFFICE 2,321,971

TELEMETERING SYSTEM

Howard I. Becker, Schenectady, N. Y., assignor to General Electric Company, a corporation of New York Application September 18, 1941, Serial No. 411,325

6 Claims. (Cl. 177—351)

My invention relates to a telemetering system and apparatus of the type in which the angular position of a pointer or the like located at a transmitting station is reproduced at a distant receiving station or stations. One object of my invention is to provide such a system which is susceptible of wide application. In carrying my invention into effect I employ synchronously rotating parts in the transmitter and receiver and periodically transmit a position-identifying signal between the synchronously rotating parts and a further important object of my invention is to employ the same transmitting channel both for synchronizing the transmitter and receiver and for transmitting the position-identifying signal.

The features of my invention which are believed to be novel and patentable will be pointed out in the claims appended hereto. For a better understanding of my invention reference is made in the following description to the accompanying drawings in which Figs. 1 and 2 respectively represent transmitting and receiving apparatus embodying my invention employing a radio transmitting channel. Fig. 3 is a fragmentary front view of a part of the transmitter of Fig. 1, Fig. 4 is a curve representing the transmitting voltage showing how it is momentarily interrupted to transmit the position-identifying signal. Fig. 5 is a modification of the invention for simultaneously transmitting a plurality of indications with the same apparatus and Fig. 6 is a face view of the dials of the measuring instruments at the transmitting station.

(Referring now to Figs. 1, 2 and 3, 10 in Figs. 1 and 3 represents a pointer which moves over and indicates on a circular dial 11 and which is located at the transmitting station. The indication of the pointer 10 on dial 11 is to be reproduced at a distant receiving station or stations such as represented in Fig. 2 by means of a similarly graduated dial 12 and a pointer 13 located at such receiving station. The pointer 10 at the transmitting station may be moved over the dial 11 in any suitable way either continuously in either direction or momentarily and at 14 I have indicated means for moving the pointer 10 which may be a measuring or pointer-positioning device of any character. Coaxial with the pivot of pointer 10 is a contact arm 15 driven by a synchronous motor 16. The pointer 10 and arm 15 have cooperating contacts at 17 which, as arm 15 moves past pointer 10, make contact momentarily to transmit a signal identifying the position of pointer 10 at the instant of contact.

18 represents a source of alternating current supply which may be an ordinary 60 cycle source of commercial frequency, although any other suitable frequency may be used. The synchronous motor 16 is supplied from such source as is also the position-signaling impulse. 19 represents a radio transmitter with its antenna 20 and in the illustrated embodiment of the invention the radio frequency wave is modulated by the 60 cycle wave from the source 18 and such source may also supply the power necessary for operating the transmitter. Connected between the source of supply 18 and radio transmitter 19 is a resistance 21. The current drawn by the radio transmitter through such resistance is such as to produce a negligible voltage drop. However, when the contacts at 17 are closed the source 18 is momentarily short circuited through such resistance and during such momentary intervals the 60 cycle wave is not transmitted. It is immaterial to my invention whether the radio transmitter ceases to effectively transmit the radio frequency or the radio frequency wave ceases to be modulated by the 60 cycle wave during such intervals. In any event the 60 cycle wave ceases to be effectively transmitted during the very short intervals during each revolution of control arm 15 when it makes connection with pointer 10 at the contacts 17. The result may be pictured as in Fig. 4 where 22 represents the 60 cycle wave as ordinarily transmitted from antenna 20 and the interruption therein at 23 represents one of the intervals during which the contacts at 17 are closed. Such interruption may be from one up to a few cycles. As represented, the interruption is for one complete cycle of the 60 cycle wave or for a time interval of $\frac{1}{60}$ of a second.

If the synchronous motor 16 be a two-pole synchronous motor driving contact arm 15 directly without gearing the arm 15 will rotate 60 revolutions per second and for ordinary purposes it will be better to reduce this speed to, say, one revolution in six seconds by using a 360 to 1 gear reduction between the motor 16 and arm 15, as represented at 22. One revolution in six seconds corresponds to 360 cycles of a 60 cycle frequency. Hence during each six seconds interval 359 cycles of the 60 cycle wave is transmitted and one cycle is omitted. This allots 360 cycles for the 360 degree circle of the dial and requires that the contacts at 17 be in contact over one degree of rotation of arm 15, assuming that pointer 10 is stationary during the interval of contact. If the pointer 10 happens to be moving in the same direction as arm 15 is driven at the instant of contact, the interval of interruption represented at 23, Fig. 3, will be longer and if pointer 10 happens to be moving in the opposite direction to that of pointer 10 at the instant of contact the interval of interruption will be shorter than that represented. In most applications, however, pointer 10 will move so much slower than contact arm 15 that for all practical purposes it may be considered as stationary. In any case where there is likely to be quite rapid movement of pointer 10 I may make the average interruption period correspond to, say, 1½ cycles and allow for a maximum interruption of two cycles and a minimum interruption of one cycle. This would require that the engagement arc of the contacts at 17 extend over an arc of 1½ degrees for the speed and frequency relations specified and would allow for movements of pointer 10 up to ⅓ the speed of contact arm 15. I may also change the speed of contact arm 15 or use a different frequency than 60 cycles and thus the arrangement is susceptible of easily made changes that will enable it to be used for a wide variety of applications.

The modulated radio frequency wave with the low frequency component interrupted as described is picked up on the antenna 23, Fig. 2, at the receiving station and received by the radio receiver 24. The modulated frequency wave is demodulated and the 60 cycle wave amplified by demodulating and amplifying apparatus represented at 25 so that the wave as represented in Fig. 4 is reproduced at the receiving station at the output terminals of the apparatus 25. The output of apparatus 25 feeds the primary 26 of a transformer 27 but for reasons to be explained a power tube 28 having a direct current supply 29 in its plate circuit is interposed so that only the positive halves of the 60 cycle wave is fed to such transformer. The transformer 27 has a secondary winding 30 which thus supplies 60 cycle energy of the form represented in Fig. 4 to a split phase synchronous motor 31. It is well known that when half cycle impulses are fed through a transformer that a corresponding frequency alternating current is produced in the secondary. However, the wave which is completely interrupted as at 23, Fig. 4, is of course not regenerated and hence Fig. 4 correctly represents the voltage output from the secondary of transformer 27. This single phase interrupted 60 cycle energy is supplied through the phase splitting device represented at 32 to a split phase synchronous motor 31.

The synchronous motor has a permanent magnet field rotor 33. It drives the pointer 13 through reduction gearing 22a such that the pointer revolves in synchronism with pointer 15 at the transmitting station. The load on the synchronous motor 31 is light and the motor has sufficient fly wheel effect, represented by fly wheel 34, that its synchronous operation is not interfered with by reason of the periodic momentary interruption of one or two cycles in its source of supply. Hence, notwithstanding the momentary interruptions of the 60 cycle source of supply the motor 31 at the receiving station runs synchronously with motor 16 at the receiving station.

The same transmitting channel employed to maintain synchronism between the synchronous motors at the transmitting and receiving stations is also employed to transmit the position-indicating signals which signals are the interruptions in the otherwise continuous alternating current wave. Transformer 27 has a second secondary winding 35 connected in bucking relation with the secondary of a transformer 36 also supplied from the output of demodulator amplifier apparatus 25. A neon lamp 37 positioned to illuminate the pointer 13 and dial 12 is contained in the bucking secondary transformer circuit. During uninterrupted transmission of the 60 cycle wave the secondary voltage of transformer 36 cancels the secondary voltage of winding 35 and no flashing of the lamp 37 occurs. When the 60 cycle wave is interrupted as at 23, Fig. 4, there is a corresponding interruption in the energization of the primaries of transformers 27 and 36 from the 60 cycle source of supply and hence there is no voltage induced in the circuit of lamp 37 from such source. However, the synchronous motor 31 operating at synchronous speed and having a permanent magnet excited field acts as a generator for the period of the interrupted cycle and produces a cycle of A. C. voltage across winding 30 which now acts as a primary winding to induce a cycle of A. C. voltage in transformer winding 35. Due to the presence of tube 28 there is no feed-back of this A. C. cycle through the winding 26 to the primary of transformer 36 and hence the cycle of voltage produced in the circuit of lamp 37 by winding 35 is unopposed by transformer 36, and the lamp 37 flashes and illuminates the dial 12 and pointer 13 and thus reproduces the position of pointer 10 on dial 11 at the instant of the interrupted cycle.

It will be understood that during uninterrupted transmission of the 60 cycle wave, pointers 15 and 13 revolve in synchronism and in the same angular positions with respect to their dial graduations. Hence they are in the same angular positions when contact is made at 17 to interrupt the 60 cycle wave and flash the lamp 37. Hence pointer 13 when illuminated reproduces on its dial the position or indication of pointer 10 on dial 11. There possibly may occur a slight lag in the position of synchronous motor rotor 33 behind its true synchronous position at the instant of the flash but such angle of lag is small due to the fly wheel effect of the motor and is reduced six times by the gear ratio specified at 22a so that it can hardly be noticed on the dial 12 at all. However, in any case where it would otherwise show up as an error it can be correctly compensated for by advancing the pointer 13 on its shaft by a corresponding amount or by offsetting the contact parts at 17, etc., such that when the lamp 37 flashes it reveals pointer 13 in the same angular position with respect to dial 12 as is pointer 10 with respect to its dial at that instant. When the 60 cycle wave is resumed the motor 31 is in substantially true synchronous position and substantially up to speed so that there is no difficulty of its pulling into or resuming synchronous operation. The fact that its rotor 33 has a fixed polarity excitation is a further assurance that it will not slip back a pole because of the momentary power interruption.

It is now seen that synchronous operation is maintained between the transmitter and receiver and the position-indicating impulses are transmitted over the same simple transmission channel and that no separate synchronizing channel or synchronous power supply is required between the synchronous motors. As many receiving stations as desired may be operated from the same transmitter and at 38 and 39 in Fig. 2 I have indicated other receiving stations such as the one described. In the modification described the position of the pointer 10 is revealed on dial 13 every six seconds and hence fluctuations in pointer position may be followed closely. However, a more frequent or a less frequent position transmission may be had if desired. Variations in frequency of the A. C. power supply 18, Fig. 1, are immaterial.

The principle of transmission and reception described is susceptible of wide application and the apparatus employed may be modified considerably to suit different requirements and by way of illustration of these facts I have shown another modification in Fig. 5 which transmits a plurality of indications over a wire transmission channel simultaneously.

Referring to Fig. 5 the upper portion of the figure represents the transmitting apparatus, line 40 the transmitting circuit and the lower portion of the figure the receiving apparatus which is substantially similar to that shown in Fig. 2 except that no radio receiver or demodulator is required. At the transmitter I have indicated two sensitive electrical measuring instruments 41 and 42 having coaxial shafts operating indicating pointers 43 and 44 respectively. Instrument 41 is arranged to deflect its pointer 43 over a scale 45 occupying an upper sector of a circle and the instrument 42 is arranged to deflect its pointer over a scale 46 occupying a lower sector of the same circle, as indicated more clearly in Fig. 6. Corresponding dials 45a and 46a are provided at the receiving station but only one pointer 47 is used therewith.

At 48 is a vacuum tube connected to send impulses through the primary of a transformer 50 from a direct current source 49 in synchronism with the frequency of an alternating current source 18 coupled so as to normally trip the tube 48 on the positive half waves of source 18. For example, the tube may have its grid negatively biased to cut-off but at such value that the positive half waves reverse the bias and allow the tube to fire. Hence under normal conditions, alternating current of the frequency of source 18 is produced in the secondary of transformer 50 and sent over the channel 40. It will be assumed that the frequency of source 18 is 100 cycles per second.

In order to produce momentary interruptions in the alternating current wave sent out over lines 40 of the character represented at 23, Fig. 4, I prefer to momentarily interrupt the firing operations of tube 48 by rendering it non-conducting for a period corresponding to one or more cycles and this is accomplished by momentarily increasing the negative bias on the grid of the tube by connecting an additional negative bias voltage to the grid through a photocell 52.

The photocell 52 is made conducting when flashes of light strike the cell from a source 53. The time relation of occurrence of such light flashes is controlled by rotation of a scanning disk 54 driven by a synchronous motor 55 and the positions of the pointers 43 and 44. The disk 54 has a small opening 56 therein which as the disk rotates allows a beam of light 59 to trace a circular path over the face of the instrument dial assembly. The two pointers 43 and 44 have tiny mirrors 57 and 58 mounted thereon in the circle traced by the light beam 59. These mirrors are set at the proper angles to reflect such beam of light, when it strikes either mirror, to the photo-electric cell 52. It is seen that the parts comprising the light beam scanning system are coaxial with the axis of rotation of the instrument pointers so that the desired results are obtained regardless of the pointer positions about such axis. In the illustration the disk 54 has its opening 56 in position to allow light to pass to the mirror 57 on pointer 43 and be reflected to cell 52 as indicated by a full line trace of the light beam. The dotted line 60 represents the path of a light beam which will be traced when the scanning disk is rotated so that the opening 56 is aligned between source 53 and mirror 58 on pointer 44. By such an arrangement no friction contact is made with the instrument pointers and hence the instruments may be delicate and sensitive without danger of disturbing the true measurement positions of their pointers by the transmitting arrangement used.

It is seen now that the photocell will receive two momentary flashes of light from each revolution of disk 54, one flash representing the position of pointer 43 and the other flash representing the position of pointer 44. At the instant of such flashes the tube 48 ceases to be conductive on the positive half cycles of source 18 but tripping is resumed immediately following such flashes. By suitably adjusting the size of the mirrors or the opening 56 or both and the speed of the disk 54 interruptions in the 100 cycle A. C. output voltage wave of the transformer 50 of the desired duration such as one or two cycles interruptions may be obtained. For example, with 100 cycle source 18, a two-pole synchronous motor at 55 and a gear reduction between it and the disk 54 if 7.2 to 1 the disk 54 will make a complete revolution in 720 cycles. This allots two cycles for each degree of the scanning circle. If, now, the cell 52 is effectively illuminated for a period corresponding to one cycle the flashes will represent the position of the pointers within an accuracy of ½ degree. Such interruptions will not interfere with synchronous operation of motor 55 when energized from the output of the transformer 50 as represented. It is practicable to provide up to four sets of scales and pointers, one for each quadrant, about the scanning circle but for the sake of simplicity only two sets have been shown.

At the receiving station the synchronous motor 31 drives the single pointer 47 in synchronism with scanning disk 54 and in the same angular position as the opening 56 in such disk. Hence, when an interruption occasioned by a flash from pointer 43 occurs neon lamp flashes and reveals the position of pointer 47 on scale 45a and thus reproduces the indication of pointer 43 on scale 45.

At another part of the revolution cycle mirror 58 flashes a signal to cell 52 when pointer 47 is in a corresponding position with respect to scale 46a and the flash of lamp 37 reveals such position. Only one pointer and flashing lamp is required at the receiving station because the pointer 47 is automatically revealed opposite the proper scale 45a or 46a. That is, when pointer 47 is revealed at any point opposite scale 45a it is obvious that it is to be read with respect to such scale although scale 46a is also illuminated. Since the interrupted voltage wave of the character shown in Fig. 4 is impressed upon the input to the receiver of Fig. 5 in the same way as it is impressed on the corresponding apparatus in Fig. 2, the same explanation applies.

The use of the same transmitting channel and receiving apparatus for more than one indication or group of indications may be obtained by shifting the connection to the different instrument transmitters. This is indicated in Fig. 1 by the switch 61 which may be thrown to the left to substitute another instrument transmitter represented by the rectangle B. A similar switching feature could be used with the transmitter of Fig. 5.

It will be observed that in the different modifications described the power for operating the receivers and transmitters is not transferred over the transmitting channel. The essential power requirements are supplied locally and only a synchronizing voltage is required to be transmitted. This permits of transmission over great distances by the use of whatever kind of channel is available or is the most practical.

What I claim as new and desire to secure by Letters Patent of the United States is:

1. A telemetering system comprising a transmitter and a receiver each having moving parts operated continuously in synchronism, a transmitting channel between the transmitter and receiver, means for transmitting impulses over said channel for maintaining the synchronously moving parts of the transmitter and receiver in synchronism, automatic means at the transmitter for momentarily interrupting the transmission of the synchronizing impulses at times determined by an indication to be transmitted, and means at the receiver responsive to such interruptions for reproducing such indication.

2. A telemetering system comprising a transmitter including a synchronous motor, a receiver including a synchronous motor, a transmitting channel between said transmitter and receiver, means for normally supplying said channel with impulses by means of which the synchronous motors at the transmitting and receiving stations are maintained in synchronous operation, a movable device at the transmitting station cooperating with the synchronous motor thereat for momentarily interrupting the transmission of the synchronizing impulses at times related to the synchronizing impulses determined by the position of such device, and position-indicating means cooperating with the synchronous motor at the receiver and responsive to such interruptions for indicating at the receiver the position of the movable device of the transmitter.

3. A signaling system having transmitting and receiving stations, a transmitting channel between said stations, means for transmitting over said channel an alternating impulse of substantially constant frequency, means at the transmitting station for interrupting such transmission for the purpose of transmitting signals, each interruption not exceeding a few cycles duration, a synchronous motor at the receiving station continuously maintained in synchronism with the alternating impulses transmitted over said channel irrespective of such interruptions, said motor having a constantly magnetized rotating field, an electric signal at the receiving station operated from energy generated by the rotation of the magnetic field of said motor during the interruptions of said alternating impulse, and means for preventing the energization of said signal during the uninterrupted transmission of the alternating impulses.

4. In a telemetering system of the type wherein synchronously rotating transmitter and receiver parts are employed, a receiver comprising a synchronous motor having a permanent magnet rotating field, an indicator rotated by said motor, a transformer having primary and secondary windings through which said motor is energized, a lamp for illuminating the indicator also energized through said transformer, a source of alternating current supply, a bucking transformer supplied therefrom having a secondary winding included in the lamp circuit, and connections including a valve for energizing the first mentioned transformer in synchronous relation with said source, the arrangement being such that normally the lamp remains unenergized but when the source of supply is momentarily interrupted the lamp is energized from the synchronous motor acting as a generator without feedback through the valve.

5. A telemetering system comprising transmitting and receiving stations each having synchronous motors, a transmitting channel connecting said stations, means for normally energizing said channel with synchronizing impulses by means of which the synchronous motors are maintained in synchronism, transmitting and receiving parts at the respective stations driven by said motors in synchronism and having regularly recurring cycles of operation, movable means at the transmitting station cooperating with the cyclic operating part thereat for interrupting the transmission of the synchronizing impulses at a point in such cycles of operation determined by the position of such movable device, and means at the receiving station responsive to such interruptions for identifying the position of such movable device with respect to the cyclic operating part of the receiving station, the duration of such interruptions being sufficiently short as not to interfere with the continuous synchronous operation of said motors.

6. A telemetering system comprising transmitting and receiving stations, a transmitter at the receiving station comprising a cyclic operating scanning devce driven by a synchronous motor and cooperating with a movable indicator for transmitting a position-indicating signal at a point in the cycle of operaton of the scanning device determined by the indicating position of the movable indicator, a receiver at the receiving station comprising an indicator driven by a synchronous motor in synchronous relation with the cyclic operating scanning device at the transmitting station and a lamp for flash illumination of the receiving station indicator in response to the position-indicating signal produced at the transmitting station, a single transmitting channel between said stations, and means for supplying alternating impulses to said channel for maintaining the synchronous motors at the different stations in synchronism, the position-indicating signals being transmitted over the same channel and comprising momentary interruptions in the alternating impulses.

HOWARD I. BECKER.